(12) United States Patent
Baird (10) Patent No.: US 8,439,453 B2
(45) Date of Patent: May 14, 2013

(54) METHOD AND ASSEMBLY FOR MOUNTING AN AUTOMOBILE RIM TO A MOTORCYCLE

(76) Inventor: Rodney R. Baird, Homewod, IL (US)

( * ) Notice: Subject to any disclaimer, the term of this patent is extended or adjusted under 35 U.S.C. 154(b) by 0 days.

(21) Appl. No.: 12/945,033

(22) Filed: Nov. 12, 2010

(65) Prior Publication Data

US 2012/0161494 A1 Jun. 28, 2012

Related U.S. Application Data (63) Continuation of application No. 12/287,722, filed on Oct. 12, 2008, now abandoned, which is a continuation-in-part of application No. 11/524,814, filed on Sep. 21, 2006, now Pat. No. 7,437,812.

(51) Int. Cl.
  *B60B 27/06* (2006.01)
(52) U.S. Cl.
  USPC .......................... 301/6.8; 301/6.9; 301/110.5

(58) Field of Classification Search ............... 301/110.5, 301/6.1, 6.8, 6.9; 280/205, 63; 180/218, 180/219, 224; 29/894.3, 894.321, 894.322; 188/26

See application file for complete search history.

(56) References Cited

U.S. PATENT DOCUMENTS

| 5,992,587 | A * | 11/1999 | Maldonado | 188/344 |
| 6,283,255 | B1 * | 9/2001 | Gardner et al. | 188/18 A |
| 6,578,676 | B1 * | 6/2003 | Lin | 188/26 |
| 7,121,570 | B2 * | 10/2006 | Parker | 280/285 |
| 7,210,748 | B1 * | 5/2007 | Velazquez | 301/110.5 |
| 2003/0107259 | A1 * | 6/2003 | Rutter | 301/6.8 |
| 2007/0158998 | A1 * | 7/2007 | Aron | 301/110.5 |

* cited by examiner

*Primary Examiner* — Kip T Kotter
(74) *Attorney, Agent, or Firm* — Clifford Kraft

(57) ABSTRACT

A method and assembly for mounting an auto rim and either motorcycle or auto tire as a motorcycle rear wheel. The assembly allows tires of different widths and diameters to be used on the rear of motorcycles that have single side swing arms and standard swing arms. The method and assembly allows a left side or right side drive which can be a belt or chain. A hub with bearings and spacers are mounted with a brake rotor disk and a drive pulley in tandem to produce a hub assembly.

4 Claims, 8 Drawing Sheets

METHOD AND ASSEMBLY FOR MOUNTING AN AUTOMOBILE RIM TO A MOTORCYCLE

This is a continuation of application Ser. No. 12/287,722 filed Oct. 12, 2008, now abandoned, which was a continuation-in-part of application Ser. No. 11/524,814 filed Sept. 21, 2006 issued as U.S. Pat. No. 7,437,812. Applications Ser. Nos. 11/524,814 and 12/287,722 are hereby incorporated by reference.

BACKGROUND

1. Field of the Invention

The present invention relates generally to the field of motorcycles and more particularly to a method and assembly for mounting an automobile rim with a motorcycle or auto tire on a motorcycle.

2. Description of the Prior Art

It is known in the art of motorcycles to mount various rims and tires on motorcycles. Several attempts to mount auto rims and tires have been reported. Car tires and motorcycle tires have been mounted on car rims which were then mounted on motorcycles. However, it is particularly difficult to mount a wide car tire on the rear of a motorcycle and still retain a disk brake and a drive chain or belt. It is particularly difficult to mount such a tire on the rear of a motorcycle where the result can be a left side drive or can be flipped to create a right side drive as well as use different sized tires and a standard swing arm and a single side swing arm.

It would be advantageous to have a method of mounting automobile rims with a motorcycle or auto tires of various sizes (both width and diameters) on a motorcycle while preserving the capability to incorporate a disk brake, either a drive chain or belt, and use either a single side or standard swing arm in a left side or right side drive. In particular, it would be advantageous to be able to mount a TT-2 American Racing wheel on a motorcycle. The diameter could be 17 or 18 inches with a width of around 11 inches.

SUMMARY OF THE INVENTION

The present invention relates to a method for assembling a motorcycle rear hub so that the hub can mount an auto rim with a motorcycle or auto tire. The steps in the method of the present invention are generally placing a bearing in a wheel mount hub; inserting a bearing spacer tube into the hub and bearing; inserting a plurality of wheel mounting screws into the hub; attaching a brake rotor to the hub using a plurality of brake rotor mounting screws; placing a brake disk to drive pulley spacer in contact with the brake disk; inserting a plurality of inner bearings into the brake disk to drive pulley spacer; attaching the brake disk to drive pulley spacer to the hub using a plurality of spacer mounting screws so that the brake rotor is between the brake disk to drive pulley spacer and the hub; mounting a drive pulley to the brake disk to drive pulley spacer using a plurality of drive pulley mounting screws.

DESCRIPTION OF THE FIGURES

To better understand the present invention, a person of skill in the art is directed to the following figures.

Several illustrations have been presented to better aid in understanding the present invention. The scope of the present invention is not limited to what is shown in the figures.

DESCRIPTION OF THE INVENTION

The present invention relates to a method of mounting an auto rim and either motorcycle or auto tire of various sizes on a motorcycle retaining the capability to have a disk brake, a chain or belt drive and/or a single side swing or standard swing arm.

Figure 1:
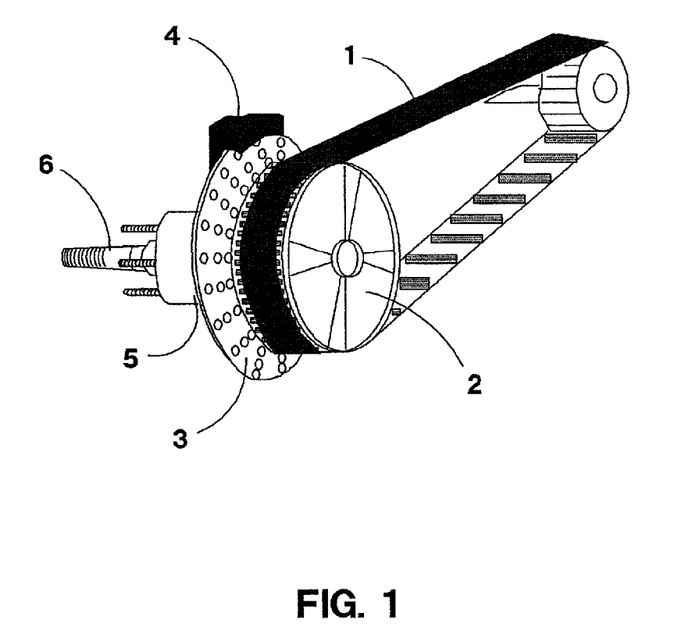
FIG. 1 shows a motorcycle belt drive with an auto rim mounting in the rear.

FIG. 1 shows a view of a motorcycle belt drive. A drive belt 1 can be seen on the right side. The drive belt 1 engages a drive pulley 2. The motorcycle assembly in FIG. 1 can use a single side swing or standard arm (not shown). A disk brake 3 can be seen with a caliper 4. A shaft 6 passes through a bearing 5 to form a rotating wheel. The entire assembly of a hub, brake disk 3 and drive pulley 2 are mounted in tandem to form the basis for the rear wheel. The present invention relates to a method of assembling this tandem wheel so that different rims, tires, belts or chains and swing arms may be used.

Figure 2:
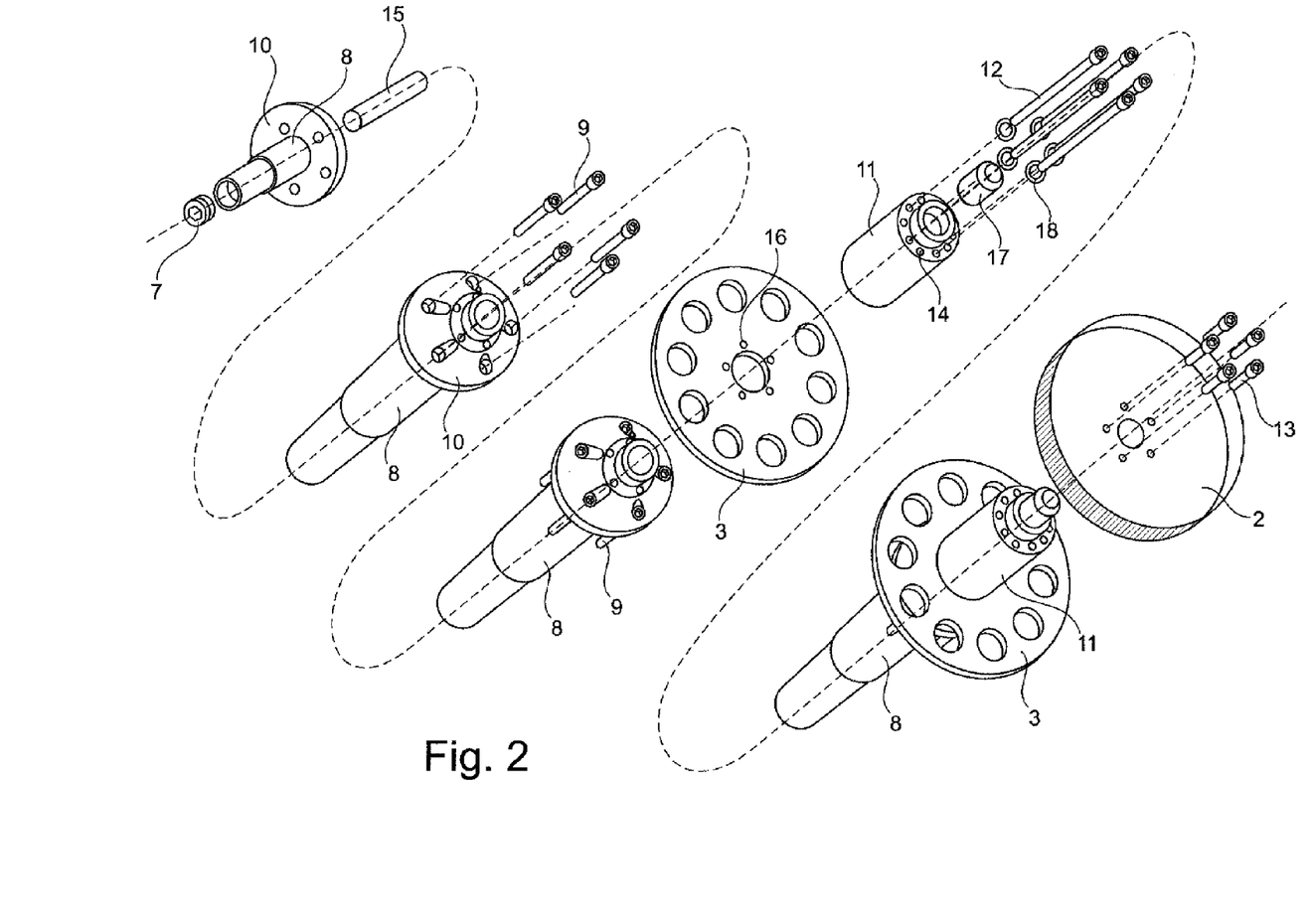
FIG. 2 shows a preferred assembly sequence to allow an auto rim and tire to be used as the rear wheel of a motorcycle.

FIG. 2 shows a particular sequence of assembly of the present invention. In this embodiment, one or two 52 mm OD×25 mm ID bearings 7 and 17 are inserted in wheel mount drive hub 8 and drive pulley spacer 11. Drive hub 8 contains a flange 10, and a bearing spacer tube 15 of 1.250 in.×0.120 in. wall steel or aluminum or other metal that is inserted in the hub 8. Five wheel mounting screws 9 of ½ 20×2 inch alien head (grade 9) are screwed into the hub flange 10 for mounting the wheel. A brake rotor 3 which is a brake disk that can have a generally increased center ID is inserted over the end of the hub 8 flange covering the heads of the alien screws 9. Screw holes 16 are provided in the rotor 3 for these screws 9. The brake rotor 3 can have several screw holes on a smaller circle than the wheel mounting allen screws 9 (a preferred number is five). A brake disk to drive pulley spacer 11 with holes 14 that match the holes in the brake rotor 3 can be mounted on the hub flange 8 holding the brake rotor 3 in place. One or two 52 mm OD×25 mm ID bearings can be inserted into the drive pulley spacer 11. Five mounting screws 12 ⁷⁄₁₆ 14×1.75 inches (grade 9) with ARP PN 200-8681 or similar washers 18 can be inserted through the brake disk to drive pulley spacer 11 to hold the assembly together. Finally, a drive pulley 2 can be mounted on the brake disk to drive pulley spacer 11 with pulley mounting screws 13. These can be socket head ⁷⁄₁₆ 14×1.25 inch, (grade 9) screws. The threaded holes 14 for these screws can be indexed or clocked half-way between the mounting screws 12. In this manner, and in this order, the entire assembly can be put together. It should be noted that the drive pulley 2 can be a chain sprocket for a chain drive system. The embodiment herein described is to illustrate the present invention and aid in its understanding. Certain dimensions have been given and figures have been presented. The scope of the present invention covers numerous other embodiments with different sized parts and different hole arrangements. Bolts and screws can have US or metric threads and/or dimensions. It is preferred that the brake disk to drive pulley spacer mounting screws and the drive pulley mounting screws have socket heads and be grade 9 or better.

Figure 3:
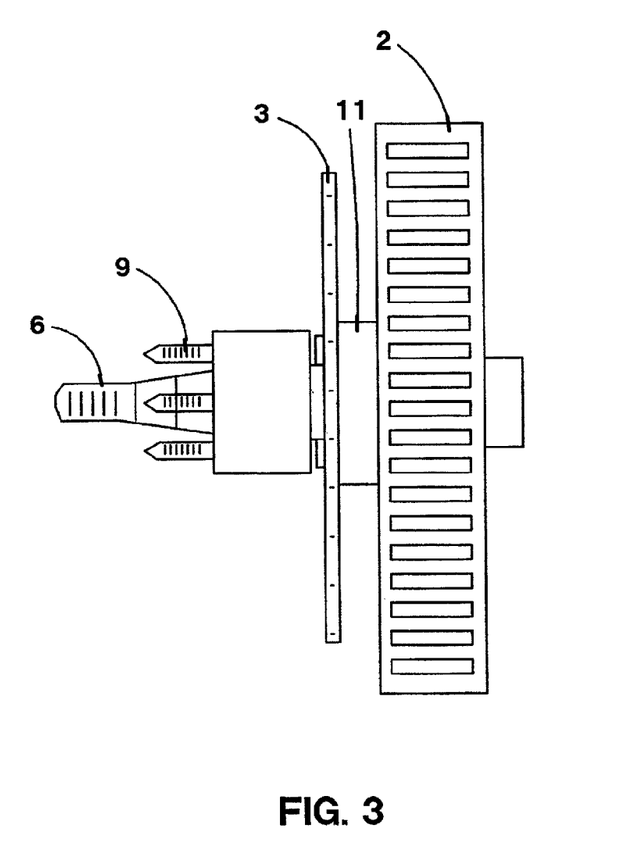
FIG. 3 shows a rear view of the embodiment of FIGS. 1-2.

FIG. 3 is a rear view of the embodiment of FIGS. 1-2. The mounting screws 9, shaft 6, brake rotor 3, drive pulley 2 and brake rotor to drive pulley spacer 11 can be clearly seen. The brake caliper if not shown in FIG. 3.

Figure 4:
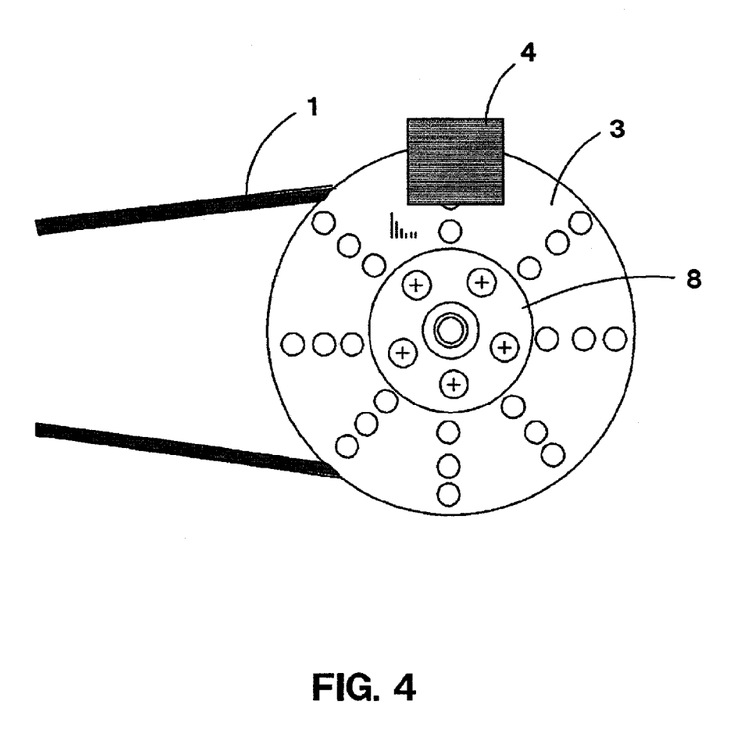
FIG. 4 shows a left-side view of the embodiment of FIGS. 1-2.
Figure 5:
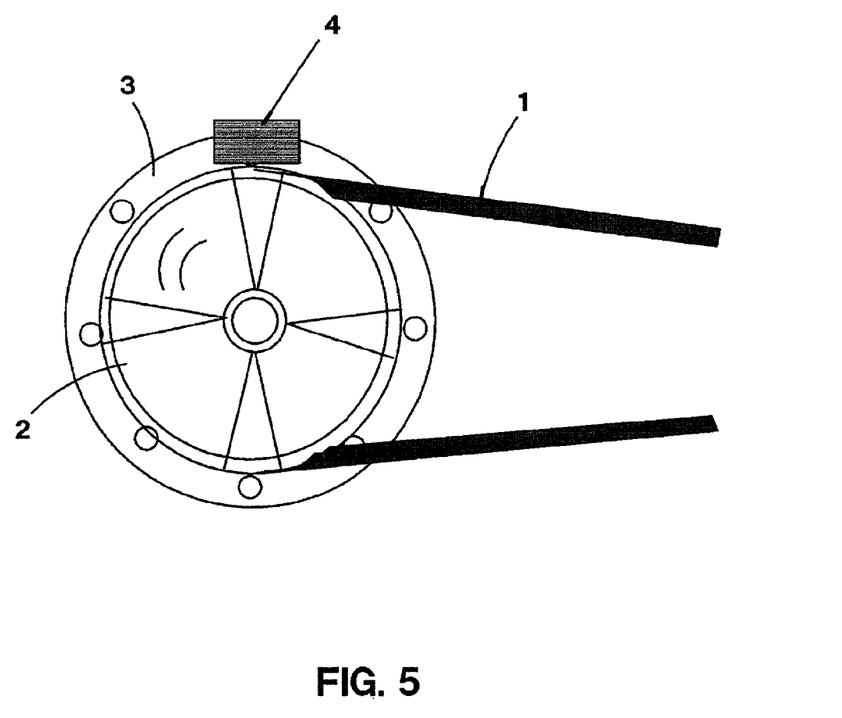
FIG. 5 shows a right-side view of the embodiment of FIGS. 1-2.

FIGS. 4-5 show the embodiment of FIG. 1 from the left and right sides with the brake caliper 4.

Figure 6:
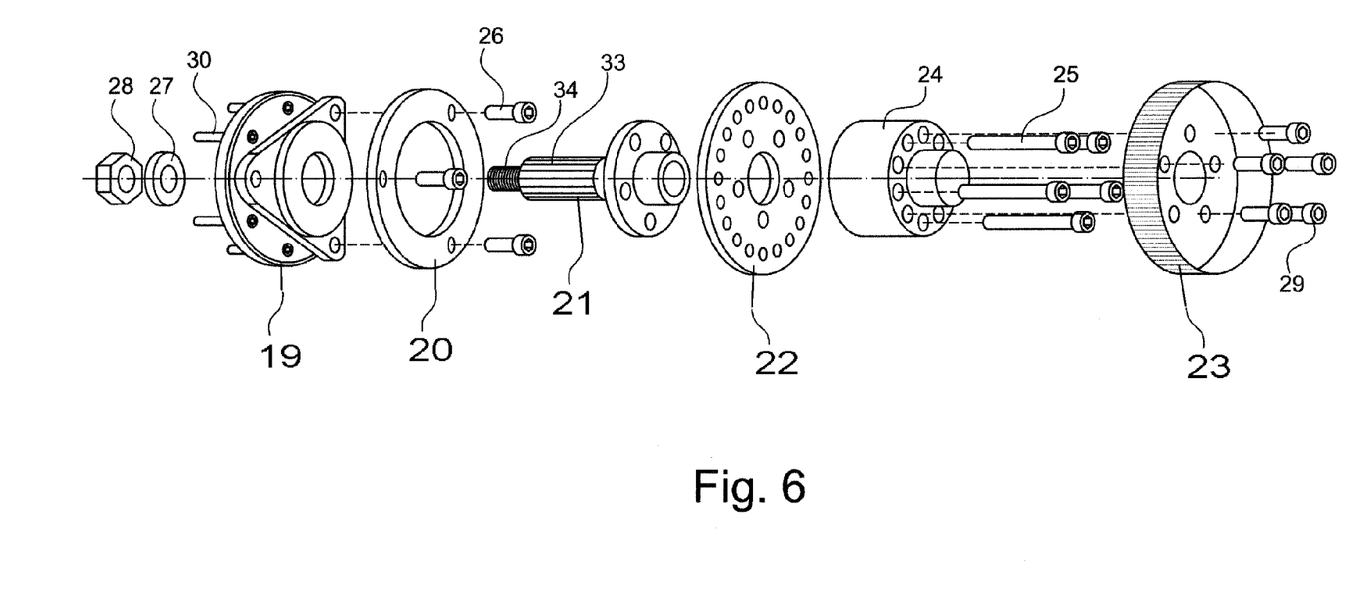
FIG. 6 shows an alternate embodiment of an assembly for a single-sided swing arm.

FIG. 6 shows an assembly sequence for a single-sided swing arm type hub. A bearing hub 19 contains a fixture with wheel lugs 30 that are used to mount an automobile rim. The bearing hub 19 contains a bearing and is penetrated by a splined drive axle 21. Splines 33 drive the fixture. A mounting plate 20 with mounting bolts 26 is inserted over the bearing hub 19. A brake disk 22 can be bolted to the drive axle 21 using a brake disk to drive pulley sprocket adapter 24. Bolts 25 are used to hold the brake disk 22 on the drive axle 21. A drive pulley or sprocket 23 can be mounted to the adapter using bolts 29. The splined drive axle 21 is held in the bearing hub 19 with a nut 28 and washer 27 that screws on its distal end 34.

Figure 7:
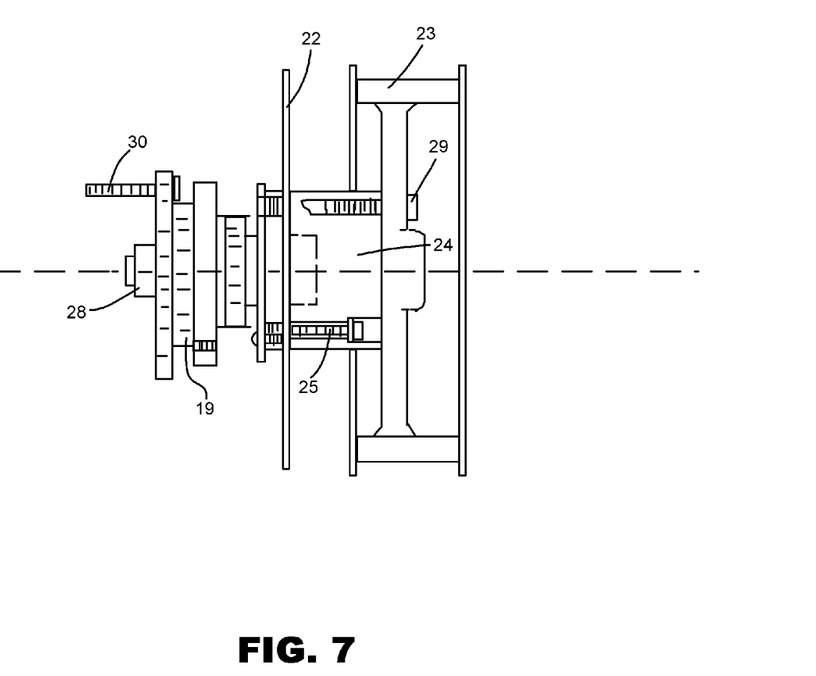
FIG. 7 shows the embodiment of FIG. 6 assembled.

FIG. 7 is a side view of the assembled sequence from FIG. 6. The wheel lugs 30, end nut 28 and bearing hub 19 can be clearly seen. The brake disk 22 is held in place by the brake disk to drive adapter 24 which is held by bolts 25. The drive pulley 23 is mounted on the adapter and held in place with bolts 29.

Figure 8:
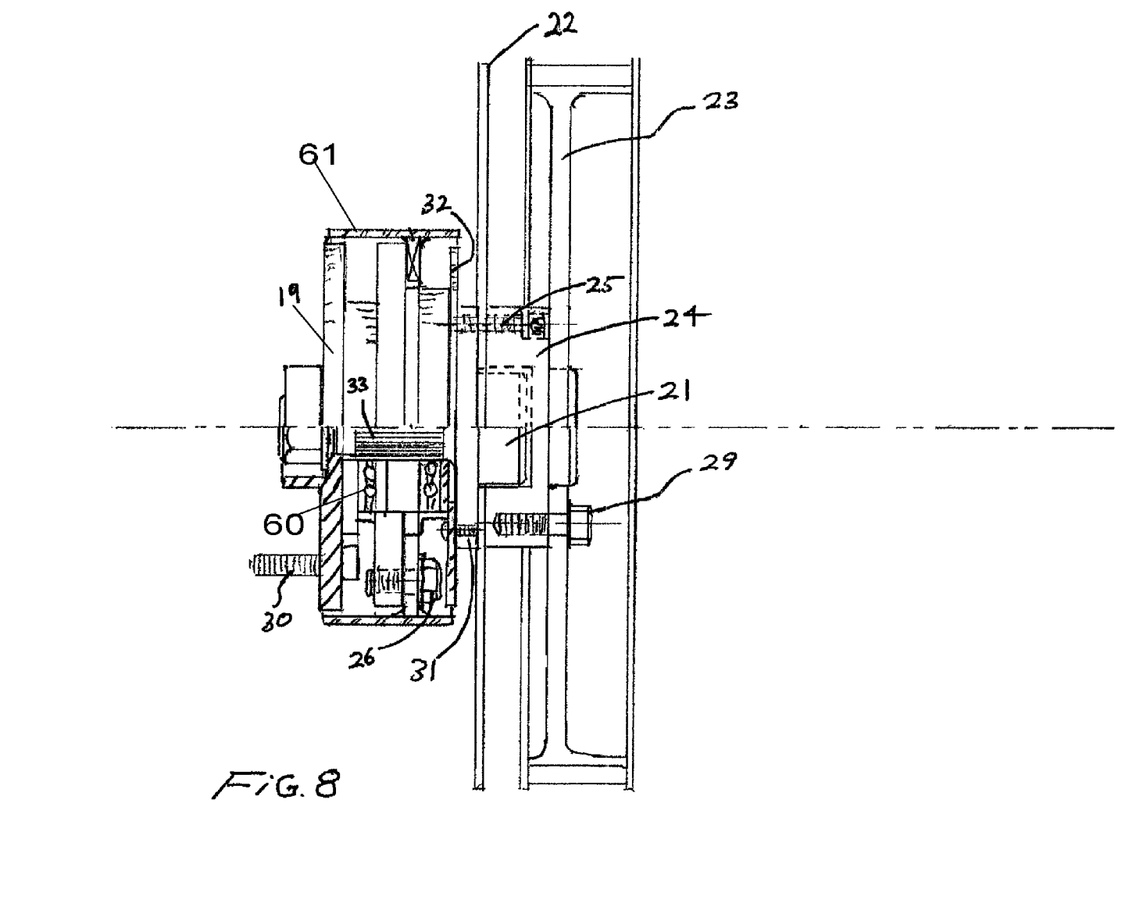
FIG. 8 shows an alternative embodiment.

FIG. 8 shows an alternative embodiment using a bearing cover. Here the lug bolts 30 can be seen on the bearing hub 19. The splined drive axle 21 passes through the bearing hub 19 and at least one bearing 60 and is bolted in the front. The drive splines 33 can be seen in section. A barrier cover 32 can be seen held in place by screws 31. The brake disk 22 is held on the adapter 24 with bolts 25. The pulley or sprocket 23 is held on the adapter 24 with bolts 29. A structure 61 radially encloses the bearing hub 19, mounting plate 20 and the barrier cover 32.

Several descriptions and illustrations have been presented to explain and aid in understanding the present invention. On of skill in the art will realize that numerous changes and variations are possible without departing from the spirit of the invention. Each of these changes and variations are within the scope of the present invention.

I claim:

1. An assembly used to mount an auto rim on a motorcycle comprising:
   a bearing hub containing at least one bearing, said bearing hub adapted to engage an auto rim;
   a drive axle passing through said bearing hub and held in position by a nut engaging threads at a distal end of said axle, said drive axle having a circular head at its proximal end;
   a brake disk bolted to said circular head of said drive axle with a plurality of bolts, wherein said plurality of bolts extend through the brake disk to a brake disk-to-drive pulley adapter;
   a drive pulley attached to said brake disk-to-drive pulley adapter.

2. The assembly of claim 1 further comprising a mounting plate mounted between said bearing hub and said brake disk.

3. The assembly of claim 1 further comprising a bearing cover covering said bearing hub.

4. The assembly of claim 1 wherein said drive pulley is bolted on said brake disk-to-drive pulley adapter with $7/16$ 14×1.25 inch bolts.

* * * * *